July 26, 1955
C. E. SHERMAN
2,714,015
SPLASH GUARD FOR VEHICLE WHEELS
Filed July 19, 1954
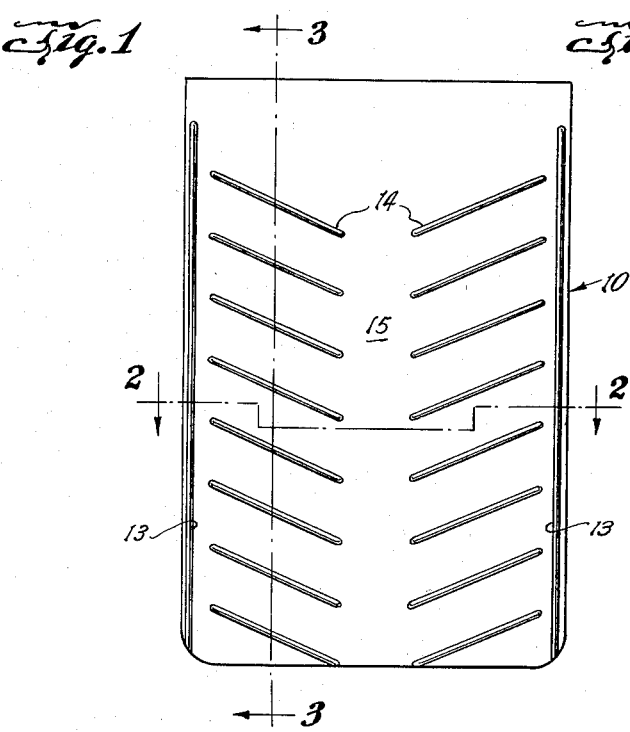
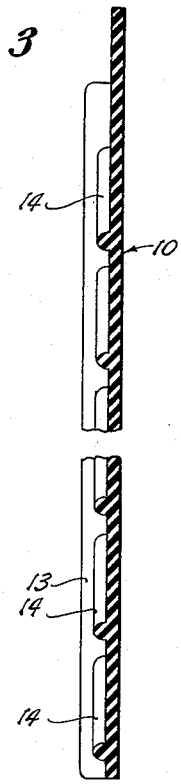
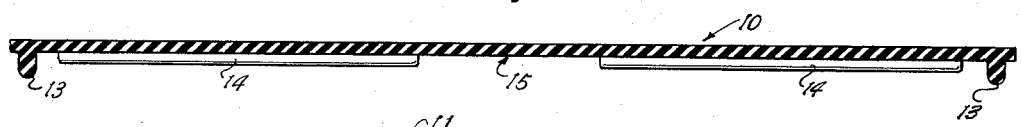
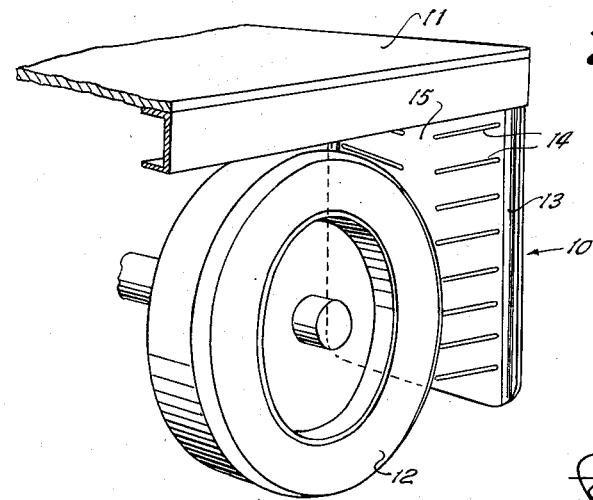
Chester E. Sherman
INVENTOR
BY
ATTORNEY

2,714,015
SPLASH GUARD FOR VEHICLE WHEELS

Chester E. Sherman, Dallas, Tex.

Application July 19, 1954, Serial No. 444,023

5 Claims. (Cl. 280—154.5)

This invention relates to splash guards for vehicles and more particularly to splash guards of rubber or other composition adapted to be suspended behind the rear wheels of trucks or other vehicles as a protection for trailing vehicle against mud and slush thrown upwardly and rearwardly by the truck wheels.

The principal object of the invention is to provide a splash guard which has been conceived not only to intercept road slush cast rearwardly by the rear wheels of a truck but likewise to deflect much of the slush directed laterally by conventional guards and to cause the same to be directed towards the midsection of the splash guard and downwardly for discharge off the bottom of the guard. In thus disposing of the slush, a measure of protection is afforded vehicles passing alongside a truck equipped with the invention, preventing the splashing of such passing vehicles with slush.

Another object of the invention is to provide a splash guard composed preferably of a sheet of molded rubber composition, on the front surface of which are formed vertical baffles adjacent to and coextensively parallel with the side edges of the sheet and a series of vertically spaced, inclined baffles on opposite sides of the vertical midsection of the sheet into which slush, flung upwardly by the rear wheels of a truck behind which the splash guard is suspended, is directed by the inclined baffles. A considerable portion of the slush cast rearwardly and upwardly by the vehicle wheels will be prevented from being deflected in lateral directions by the vertical baffles and will be conveyed to the intermediate area of the splash guard by the inclined baffles, to be drained off at the bottom of said intermediate area.

Still another object of the invention is to provide a splash guard of flexible material having vertical and inclined ribs on one face thereof confronting the wheels of a vehicle on which the guard is suspended, the said ribs being effective to perform the dual purpose of providing baffles for the disposition of slush splashed against the guard by the vehicle wheels and to reinforce the splash guard against damage.

Other objects will appear as the description proceeds when considered with the annexed drawing, wherein:

Figure 1 is a front elevational view of a splash guard constructed according to the invention.

Figure 2 is a transverse sectional view taken on line 2—2 of Figure 1.

Figure 3 is a longitudinal sectional view taken on line 3—3 of Figure 1, and

Figure 4 is a fragmentary perspective view of a truck bed and rear wheel, showing the operative position of the invention on a truck.

Continuing with a more detailed description of the drawing, reference numeral 10 denotes generally a sheet of flexible material which is preferably of a molded rubber composition. This sheet may be of any suitable shape but is preferably rectangular and is suspended at one end in any desired manner from the rear end of a truck body or bed 11 (Figure 4) behind the wheels 12, thus to intercept slush thrown rearwardly and upwardly by the rear wheels 12.

The conventional splash guards used on trucks without fenders are only partly effective to protect vehicles from being splashed with road slush. While these guards do intercept rearwardly thrown slush they add to the discomfort of motorists seeking to pass a truck by casting the slush laterally and frequently into the passing vehicle through its windows.

It is the purpose of the present invention to not only intercept rearwardly thrown slush but also to preclude, to a great extent, the laterally thrown slush which is caused by its impingement with the surface of the guards confronting the wheels. To accomplish this, the sheets 10 constituting the slush guards are each formed with a longitudinal rib 13 at or adjacent to each side edge of the sheet and coextensively parallel therewith. These ribs extend well outwardly from the surface of the sheet and serve in the capacity of baffles against which the laterally thrown water impinges to prevent its passage beyond the edges of the guard.

Formed on the surface of the sheet 10 between the ribs 13 are two rows of oblique or inclined, vertically spaced ribs 14. The ribs 14 may be said to be in vertically spaced pairs converging toward the center or midportion 15 of the sheet, the ribs of each pair being separated at the mid-portion 10 to define a vertical passage into which slush is drained from the ribs 14 which serve as baffles. The slush which is prevented by the vertical baffles 13 from being cast laterally away from the guard 10 is caught up by the baffles 14 and conveyed thereby into the central passage 15 down which the slush passes to be discharged off the lower edge of the guard.

It is preferred that the baffles 14 be slightly less in height or distance from the surface of the sheet 10 than the vertical side baffles 13 since the former are drainage baffles while the baffles 13 must either intercept or deflect outwardly thrown slush to prevent its being projected against passing vehicles.

In addition to the baffling effects provided by the ribs 13 and 14, these serve also as reinforcements for the splash guard which prevent tearing, breaking or other damage to which the guards may otherwise be subjected.

It is understood that while a specific baffle arrangement is shown and described, the arrangement may be altered so long as the desired effect of intercepting laterally thrown slush and directing the slush toward the midsection and downwardly off the lower edge of the guard is attained.

What is claimed is:

1. As a new article of manufacture, a splash guard for a vehicle wheel comprising a rubber sheet of substantially rectangular shape, a rib coextensively parallel with and adjacent to each longitudinal edge of said sheet on the surface thereof confronting said wheel, and a plurality of longitudinally spaced inclined ribs on said surface and directed downwardly toward a blank intermediate portion of said sheet, said longitudinal and inclined ribs defining baffles effective to constrain slush thrown against said sheet by said wheel to flow inwardly into said intermediate portion and downwardly thereon for discharge at the bottom of said sheet.

2. As a new article of manufacture, a splash guard for a vehicle wheel comprising a substantially rectangular sheet of flexible material adapted to be suspended at its upper edge from said vehicle behind a rear wheel thereof, said sheet being formed on one face with vertical ribs adjacent each edge thereof and coextensive therewith to define baffles intercepting slush thrown by said wheel and deflected laterally by said sheet, and means integrally formed on said sheet intermediate said ribs and relatively spaced vertically from the upper to the lower portions of said sheet for directing said intercepted slush inwardly toward the center section of said sheet to be drained therefrom at the bottom.

3. As a new article of manufacture, a molded rubber sheet of substantially rectangular shape adapted to be suspended at one end to the rear end of a vehicle behind a wheel thereof, said sheet having integrally molded ribs on the surface thereof confronting said wheel and extending inwardly from the side edge of said sheet in vertically spaced relationship from top to bottom thereof, said ribs being effective to intercept slush thrown against said sheet by said wheel and deflected laterally by its impingement on said sheet and to direct said intercepted slush toward the middle of said sheet for drainage from the lower edge thereof.

4. As a new article of manufacture, a sheet of flexible material of substantially rectangular shape adapted to be suspended at its upper end to the rear end of a vehicle for disposition behind a rear wheel thereof to intercept slush thrown rearwardly of said vehicle by said rear wheel, said sheet having embossed ribs, one adjacent each edge and parallel therewith to define baffles for slush thrown laterally outwardly from said sheet and a plurality of ribs formed integrally with said sheet intermediate said embossed ribs and defining baffles arranged to direct said laterally thrown slush toward the middle of said sheet for drainage thereof from said sheet at its lower edge.

5. The structure of claim 4, in which the said plurality of ribs on said sheet are arranged in vertically spaced pairs, the ribs of each pair being disposed one on each side of the mid-portion of said sheet and downwardly convergent to define a longitudinal passage for slush draining from said convergent ribs.

References Cited in the file of this patent

UNITED STATES PATENTS

| | | |
|---|---|---|
| 1,759,793 | Lund | May 20, 1930 |
| 2,683,612 | Bacino | July 13, 1954 |

FOREIGN PATENTS

| | | |
|---|---|---|
| 7,956 of 1904 | Great Britain | Feb. 9, 1905 |
| 41,156 | Netherlands | July 15, 1937 |
| 209,622 | Great Britain | Jan. 17, 1924 |
| 665,962 | Great Britain | Nov. 7, 1950 |